US005416163A

United States Patent [19]
Coolbaugh et al.

[11] Patent Number: 5,416,163
[45] Date of Patent: May 16, 1995

[54] POLYMER BLENDS CONTAINING A SOLID ELASTOMERIC BLOCK COPOLYMER

[75] Inventors: Thomas S. Coolbaugh, Morrisville; Frederick C. Loveless, Yardley, both of Pa.; Demetreos N. Matthews, Ewing, N.J.

[73] Assignee: Mobil Oil Corporation, Fairfax, Va.

[21] Appl. No.: 322,040

[22] Filed: Oct. 12, 1994

Related U.S. Application Data

[60] Division of Ser. No. 195,180, Feb. 14, 1994, Pat. No. 5,359,009, which is a division of Ser. No. 735,552, Jul. 25, 1991, Pat. No. 5,292,820, which is a continuation-in-part of Ser. No. 466,233, Jan. 16, 1990, Pat. No. 5,187,236.

[51] Int. Cl.$^6$ ............... C08L 53/02; C08L 67/00; C08L 77/00
[52] U.S. Cl. ................. 525/98; 525/92 B; 525/99
[58] Field of Search ................ 525/92, 98, 99

[56] References Cited

U.S. PATENT DOCUMENTS

| | | | |
|---|---|---|---|
| 3,887,515 | 6/1975 | Pennington | 260/40 R |
| 4,120,915 | 10/1978 | Fodor et al. | 260/880 B |
| 4,194,057 | 3/1980 | Brankling | 585/11 |
| 4,421,898 | 12/1983 | Lundberg | 525/186 |
| 4,879,349 | 11/1989 | Hoxmeier | 525/314 |
| 4,980,331 | 12/1990 | Hoxmeier | 502/117 |
| 5,057,582 | 10/1991 | Hoxmeier | 525/338 |
| 5,242,986 | 8/1992 | Gibler | 525/332.8 |
| 5,268,427 | 12/1993 | Coolbaugh | 525/98 |
| 5,306,780 | 4/1994 | Coolbaugh | 525/314 |

FOREIGN PATENT DOCUMENTS 0315280 5/1989 European Pat. Off..
328729 7/1989 Japan.

OTHER PUBLICATIONS

Falk, Journal of Polymer Science: Part A-1, vol. 9, 2617-2623 (1971).
Falk, Die Angewandte Chemie 21 (1972) 17-23 (No. 236).
Mohajer et al., Polymer, 1982, vol. 23 Sep., 1523-1535.

Primary Examiner—Vasu S. Jagannathan
Attorney, Agent, or Firm—A. J. McKillop; M. D. Keen

[57] ABSTRACT

There are disclosed novel, solid, elastomeric block copolymers with improved resistance to cold flow wherein either 1) the terminal blocks are polymers of at least one conjugated diene I, e.g., isoprene, which contains at least five carbon atoms with at least one of each pair of double-bonded carbon atoms in the polymerized diene I units being additionally single-bonded to two carbon atoms, at least one middle or interior block is a polymer of butadiene, and at least one middle or interior block is a polymer of at least one aryl-substituted olefin, e.g., styrene; or 2) the terminal blocks are random copolymers of at least one diene I as previously defined and butadiene, and at least one middle or interior block is a polymer of at least one aryl-substituted olefin.

The invention also encompasses the selective hydrogenation of the foregoing polymers such that substantially all of the residual double bonds of the polymerized butadiene units are hydrogenated while a sufficient number of polymerized I units remain unsaturated to provide a basis for subsequent vulcanization or crosslinking.

30 Claims, No Drawings

POLYMER BLENDS CONTAINING A SOLID ELASTOMERIC BLOCK COPOLYMER

CROSS-REFERENCE TO RELATED APPLICATION

This is a division of application Ser. No. 08/195,180, filed Feb. 14, 1994, now U.S. Pat. No. 5,359,009, which is a divisional of Ser. No. 07/735,552, filed Jul. 25, 1991 by Coolbaugh et al., now U.S. Pat. No. 5,292,820, which is a continuation-in-part of Ser. No. 07/466,233, filed Jan. 16, 1990, now U.S. Pat. No. 5,187,236.

BACKGROUND OF THE INVENTION

1. Field of the Invention

This invention relates to novel, solid, elastomeric block copolymers having a degree of unsaturation sufficient for desired vulcanization or cross-linking, or other chemical modification, but not so high as to cause the copolymer to be susceptible to an undesirably large amount of oxidative, thermal or photolytic degradation, and also having improved resistance to cold flow and improved "green" strength before vulcanization.

2. Description of Related Art

The following information is disclosed in accordance with the requirements of 27 CFR 1.56, 1.97 and 1.98.

Elastomers (or rubbers) of either natural or synthetic origin usually require vulcanization for transformation into insoluble, non-deformable high strength elastomeric products. Before vulcanization, rubbers possess inferior properties and low strength which limit their utility.

There are a number of well known methods for achieving the vulcanization, also referred to as cross-linking, of unsaturated elastomers. Such methods include the use of sulfur and accelerators, peroxides, benzoquinone dioxime, certain phenolic resins and similar acents. Any of the above or any other well known vulcanizing techniques may be utilized to cross-link the elastomers of this invention.

The great majority of currently known synthetic elastomers are based on polymers or copolymers of butadiene or isoprene. These polymers, which include cis-polybutadiene, emulsion polybutadiene (EBR), styrene-butadiene copolymer (SBR), butadiene-acrylonitrile copolymer (NBR) and cis-polyisoprene, provide raw materials for the production of a very large volume of rubber goods, such as automotive tires, conveyor belts, adhesives, footwear, sponge and mechanical goods. Because of the high degree of unsaturation inherent in the polymeric backbones, these elastomers are easily and quickly vulcanizable alone or in blends. A secondary consequence of the high degree of backbone unsaturation is the instability of such elastomers in the presence of ozone and oxygen, both of which promote rapid deterioration of these elastomers.

Butyl rubber, which is a copolymer of isobutylene and 2–3% by weight (wt.) of isoprene, represents a class of elastomers far more resistant to oxygen and ozone than those based on butadiene or isoprene. The backbone of butyl rubber is primarily polyisobutylene (which provides a saturated spine) into which there is randomly copolymerized about 2–3% by wt. of isoprene to provide unsaturated sites for vulcanization. Butyl rubber finds limited use because of its relatively poor elastomeric properties, and is used primarily in applications which take advantage of its damping properties, weathering resistance and low gas permeability.

Ethylene-propylene-diene rubber (EPDM) has enjoyed substantial commercial growth as a synthetic rubber since it combines excellent oxidation resistance with good elastomeric properties. This elastomer is prepared by the polymerization of ethylene, propylene and a non-conjugated diene, such as 1,4-hexadiene, dicyclopentadiene or ethylidene norbornene. Diene incorporation is typically 5–10% by weight (wt.). The diene is randomly incorporated into the saturated ethylene-propylene backbone to provide pendant vulcanization sites.

The above prior art elastomers, with either high or low levels of unsaturation, are characterized in that, having random unsaturation, they are randomly cross-linked all along the molecular backbone during vulcanization. The success of vulcanization in incorporating all molecular chains into the final cross-linked network with minimal "loose ends" is termed the degree of network perfection. In order to insure the highest degree of network perfection attainable, randomly unsaturated elastomers must be cross-linked extensively. The large number of cross-links necessary (25 to 40 per 100,000 molecular weight) dictates that the average distance between cross-links ($M_c$) must be relatively small in comparison with the dimensions of the whole molecule. Elastomeric properties, such as elongation, depend greatly on $M_c$—the smaller the $M_c$ the worse are the elastomeric properties, e.g., the lower the elongation of the vulcanized polymer.

Highly unsaturated elastomers such as polybutadiene or natural rubber retain essentially all of their original unsaturation after vulcanization. Such high level of backbone unsaturation causes these elastomers to be very susceptible to degradation by oxygen, ozone, heat and light. Such inherent instability frequently necessitates the use of appreciable amounts of expensive stabilizing additives and automatically restricts the use of these polymers in areas where degradative conditions are severe.

Another disadvantage of many prior art elastomers is that there is nothing in their molecular structure before vulcanization to prevent their deformation when subjected to external forces. This manifests itself as a lack of "green" strength and a low resistance to cold flow caused by gravity or other forces to which the polymer is exposed before vulcanization, e.g., during shipment or storage.

Various block copolymers having excellent elastomeric properties, especially elongation, have been made in the past. For example, a block copolymer commonly known as KRATON, manufactured by Shell Chemical Company, which has outstanding properties at room temperature, is a thermoplastic elastomer consisting of block segments of polymerized styrene units and polymerized aliphatic diolefin units, such as butadiene or isoprene. The most common structure of KRATON is the linear A-B-A block, such as styrene-butadiene-styrene (S-B-S) or styrene-isoprene-styrene (S-I-S). One of such rubbers is believed to be described by Jones, U.S. Pat. No. 3,431,323. Jones discloses block copolymers containing block segments of polymerized vinyl arene monomer units, e.g., styrene, butadiene monomer units, and vinyl arene units. After the block copolymer is prepared, it may be subjected to hydrogenation to such a degree that the unsaturation of the polybutadiene block is reduced to less than 10% of its original value, while 10–25% of the poly-vinyl arene block segments are hydrogenated. Although the KRATON triblock copolymers have excellent elastomeric properties at room temperature, since they are thermoplastic materials they lose these properties at temperatures of about 80 C. (and higher). In addition, since these polymers are not chemically cross-linked, they are soluble in many organic solvents. These latter two deficiencies place some restrictions on the viable areas of application for these polymers.

Falk, JOURNAL OF POLYMER SCIENCE: PART A-1, Volume 9, 2617–2623 (1971), the entire contents of which are incorporated herein by reference, discloses a method of selectively hydrogenating 1,4-polybutadiene units in the presence of 1,4-polyisoprene units. More particularly, Falk discloses selective hydrogenation of the 1,4-polybutadiene block segment in the block copolymer of 1,4-polybutadiene-1,4-polyisoprene-1,4-polybutadiene and in random copolymers of butadiene and isoprene, with both polymerized monomers having predominately 1,4-microstructure. Selective hydrogenation is conducted in the presence of hydrogen and a catalyst made by the reaction of organoaluminum or lithium compounds with transition metal salts of 2-ethylhexanoic acid.

Falk, DIE ANGEWANDTE CHEMIE 21 (1972) 17–23 (No. 286), the entire contents of which are also incorporated herein by reference, discloses the selective hydrogenation of 1,4-polybutadiene segments in a block copolymer of 1,4-polybutadiene-1,4-polyisoprene-t,4-polybutadiene and a random copolymer of 1,4-butadiene and 1,4-isoprene.

Hoxmeier, Published European Patent Application 88202449.0, filed on November 2, 1988, Publication Number 0 315 280, published on May 10, 1989, discloses a method of selectively hydrogenating a polymer made from at least two different conjugated diolefins. One of the two diolefins is more substituted in the 2,3 and/or 4 carbon atoms than the other diolefin and produces tri- or tetra-substituted double bonds after polymerization. The selective hydrogenation is conducted under such conditions as to hydrogenate the ethylenic unsaturation incorporated into the polymer from the lesser substituted conjugated diolefin, while leaving unsaturated at least a portion of the tri- or tetra-ethylenic unsaturation incorporated into the polymer by the more substituted conjugated diolefin.

Mohajer et al., Hydrogenated linear block copolymers of butadiene and isoprene: effects of variation of composition and sequence architecture on properties, POLYMER 1982, Vol. 23, September, 1523–1535, disclose essentially completely hydrogenated butadiene-isoprene-butadiene (HBIB), HIBI and HBI block copolymers in which butadiene has predominantly 1,4-microstructure.

Kuraray K K, Japanese published patent application Number JP-328729, filed on Dec. 12, 1987, published on Jul. 4, 1989, discloses a resin composition comprising 70–99% wt. of a polyolefin (preferably polyethylene or polypropylene) and 1–30% wt. of a copolymer obtained by hydrogenation of at least 50% of the unsaturated bonds of an isoprene/butadiene copolymer.

SUMMARY OF THE INVENTION

In accordance with this invention, novel, solid, elastomeric block copolymers with improved resistance to cold flow are provided wherein either 1) the terminal blocks are polymers of at least one conjugated diene I, e.g., isoprene, which contains at least five carbon atoms with at least one of each pair of double-bonded carbon atoms in the polymerized diene I units being additionally single-bonded to two carbon atoms, at least one middle or interior block is a polymer of butadiene, denoted as "B", and at least one middle or interior block is a polymer of at least one aryl-substituted olefin S, e.g., styrene, said block copolymer comprising, for example, an average of about 1 to 50 wt. % of I polymer blocks, about 50 to 98 wt. % of butadiene polymer blocks, and about 1 to 30 wt. % of S polymer blocks, all based on the total weight of said block copolymer; or 2) the terminal blocks are random copolymers IB of at least one diene I as previously defined, and butadiene (B), and at least one middle or interior block is a polymer of at least one aryl-substituted olefin S, said block copolymer comprising, for example, an average of about 70 to 99 wt. % of IB random copolymer blocks, and about 1 to 30 wt. % of S polymer blocks, all based on the total weight of block copolymer, with the polymerized I units being an average of about 1 to 50 wt. % of each random IB copolymer block with the remainder being polymerized butadiene. The structure of the butadiene or IB polymer blocks contains sufficient branching such that after hydrogenation, these blocks contain no more than about 10% of polyethylene crystallinity. This result is accomplished by introducing side branches into the butadiene or IB polymer blocks, e.g., by controlling the microstructure of polymerized 1,3-butadiene. More particularly, the side branches are introduced into the polymer by insuring that the polymerized butadiene contains a sufficient amount of the 1,2-units to prevent the selectively hydrogenated polymer from being excessively crystalline. Thus, if the B or IB polymer blocks are predominantly (at least 50% by mole, e.g., 100% by mole) 1,3-butadiene, the polymerized butadiene, prior to the selective hydrogenation reaction, must contain not more than about 75% wt., preferably about 10 to about 70% wt., and most preferably about 35 to about 55% wt. of the 1,4-units (1,4-microstructure), and at least about 25% wt., preferably about 30 to about 90% wt., and most preferably about 45 to about 65% wt. of the 1,2-microstructure.

Specific block copolymers contemplated under this invention are the triblock copolymer

 (a)

and the pentablock copolymers

 (b)

and

 (c)

where $(I_x)$, $(B_y)$ and $(S_z)$ are polymer blocks of the indicated monomers as previously defined, $(I_xB_y)$ is a random copolymer block of monomers I and butadiene, and x, y and z indicate the average numbers of the denoted monomeric units in each block consistent with the weight percentage ranges of these monomer units set out previously.

Also contemplated under the invention are star-branched block copolymers comprising either 1) a combination of random copolymer blocks $(I_xB_y)$ and polymer blocks $(S_z)$ wherein the free end (i.e., uncoupled end) of each branch of the copolymer is a random copolymer block $(I_xB_y)$; or 2) a combination of polymer blocks $(I_x)$, $(B_y)$ and $(S_z)$ wherein the free end of each branch is a polymer block $(I_x)$. The number of monomeric units in each block is consistent with the weight percentage ranges of these units set out previously.

The invention also encompasses the selective hydrogenation of the foregoing polymers such that substantially all of the residual double bonds of the butadiene polymer blocks or the polymerized butadiene units of the IB random copolymer blocks are hydrogenated while sufficient unsaturation remains in the I polymer blocks or the polymerized I units of the IB random copolymer blocks to provide a basis for subsequent vulcanization or cross-linking. The vulcanized or cross-linked polymers are also included within the scope of the invention.

Finally, the invention includes processes for the preparation of the foregoing block copolymers using techniques of anionic polymerization.

The selectively hydrogenated block copolymers of this invention contain sufficient unsaturation in the terminal blocks so that they may be adequately vulcanized to provide near network perfection with the resulting superior mechanical properties at both room and elevated temperatures, while the substantially complete lack of ethylenic unsaturation in the middle or interior blocks provides for a high degree of oxidative, thermal and pyrolytic stability. Moreover, the high glass transition temperature of the interior S polymer blocks provide for higher green strength and the elimination or reduction of cold flow of the polymer before vulcanization. Subsequent vulcanization or cross-linking of the selectively hydrogenated polymer results in a further improvement in properties, e.g., high elongation and elasticity at room and elevated temperatures and excellent aging characteristics.

DETAILED DESCRIPTION OF THE INVENTION

General

In the block copolymers of this invention, including triblock copolymer (a), i.e., $$(I_xB_y)\text{—}(S_z)\text{—}(I_xB_y) \quad (a)$$

and the pentablock copolymers (b) and (c), i.e., $$(I_x)\text{—}(B_y)\text{—}(S_z)\text{—}(B_y)\text{—}(I_x) \quad (b)$$

and $$(I_x)\text{—}(S_z)\text{—}(B_y)\text{—}(S_z)\text{—}(I_x) \quad (c)$$

and the star-branched block copolymers comprising either (1) a combination of $(I_xB_y)$ and $(S_z)$ blocks wherein each branch terminates with a $(I_xB_y)$ block; or a combination of $(I_x)$ $(B_y)$ and $(S_z)$ blocks wherein each branch terminates with a $(I_x)$ block, the I units are at least one polymerized conjugated diene having at least five (5) carbon atoms and the following formula $$R^1\text{—}C=C\text{—}C=C\text{—}R^6 \quad (1)$$
$$\phantom{R^1\text{—C}}|\phantom{=C\text{—}}|\phantom{C=}|\phantom{C\text{—}}|$$
$$\phantom{R^1\text{—C}}R^2\phantom{=}R^3\phantom{C}R^4\phantom{C}R^5$$

wherein $R^1$-$R^6$ are each hydrogen or a hydrocarbyl group, provided that at least one of $R^1$-$R^6$ is a hydrocarbyl group, and further provided that the structure of the residual double bond in the polymerized block I has the following formula $$R^I\text{—}C=C\text{—}R^{III} \quad (2)$$
$$\phantom{R^I\text{—}}|\phantom{C=C\text{—}}|$$
$$\phantom{R^I\text{—}}R^{II}\phantom{=C\text{—}R^{II}}R^{IV}$$

wherein $R^I$, $R^{II}$, $R^{III}$ and $R^{IV}$ are each hydrogen or a hydrocarbyl group, provided that either both $R^I$ and $R^{II}$ are hydrocarbyl groups or both $R^{III}$ and $R^{IV}$ are hydrocarbyl groups;

the B units represent polymerized butadiene, wherein the structure of the residual double bonds are as indicated in the following formulae:

$$\begin{array}{cccc} H & H & H & H \\ | & | & | & | \\ \text{—}C\text{—}C=C\text{—}C\text{—} \\ | & & & | \\ H & & & H \end{array} \quad \text{or} \quad \begin{array}{cc} & H \\ & | \\ H & C=CH_2 \\ | & | \\ \text{—}C\text{—}C\text{—} \\ | & | \\ H & H \end{array}$$

$$\phantom{xxxx}1,4\text{-}\phantom{xxxxxxxxxxxx}1,2\text{-}$$

and the S units represent at least one polymerized aryl-substituted olefin. In each of the foregoing block copolymers, the average total molecular number of Polymerized I units, i.e., 2x in block copolymers (a), (b) and (c), and the average molecular total in all the branches of the contemplated star-branched block copolymers, per 100,000 M.W., i.e., per 100,000 of the total molecular weight of the block copolymer, is, for example, about 15 to 735, preferably about 30 to 370, and more preferably about 30 to 150; the average total molecular number of polymerized butadiene units, i.e., y in block copolymer (c), 2y in block copolymers (a) and (b), and the molecular total in all the branches of the contemplated star-branched block copolymers per 100,000 M.W. is, for example, about 370 to 1815, preferably about 740 to 1815, and more preferably about 1111 to 1815 per 100,000 M.W., and the average total molecular number of polymerized S units, i.e., z in block copolymers (a) and (b), 2z in block copolymer (c), and the molecular total in all the branches of the contemplated star-branched block copolymers per 100,000 M.W. is, for example, about 10 to 288, preferably about 20 to 288, and more preferably about 40 to 288. It should be noted that if the coupling technique is used to prepare block copolymers (a), (b) and (c), then the average values of x, y and z will be the same for each block where two blocks composed of the applicable polymerized units are present in the copolymer. However, if a sequential polymerization technique is used, then the average value of x, y and/or z may be somewhat different for each of the two blocks containing the applicable polymerized units in any particular copolymer.

In the residual double bond of formula (2), $R^I$, $R^{II}$, $R^{III}$ and $R^{IV}$ may all be hydrocarbyl groups. The structures of the residual double bonds in the I units defined by formula (2) and in polymerized butadiene are necessary to produce copolymers which can be selectively hydrogenated in the manner described herein to produce the selectively hydrogenated block copolymers of this invention.

The hydrocarbyl group or groups in the formulae (1) and (2) are the same or different and they are substituted or unsubstituted alkyl, alkenyl, cycloalkyl, cycloalkenyl, aryl, alkaryl or aralkyl groups or any isomers thereof. Suitable hydrocarbyl groups are alkyls of 1–20 carbon atoms, alkenyls of 1–20 carbon atoms, cycloalkyls of 5–20 carbon atoms, cycloalkenyls of 5–20 carbon atoms, aryls of 6–12 carbon atoms, alkaryls of 7–20 carbon atoms or aralkyls of 7–20 carbon atoms. Examples of suitable alkyl groups are methyl, ethyl, propyl, butyl, pentyl, hexyl, heptyl, octyl, decyl, methyldecyl or dimethyldecyl. Examples of suitable alkenyl groups are ethenyl, propenyl, butenyl, pentenyl or hexenyl. Examples of suitable cycloalkyl groups are cyclohexyl or methylcyclohexyl. Examples of suitable cycloalkenyl groups are 1-, 2-, or 3-cyclohexenyl or 4-methyl-3-cyclohexenyl. Examples of suitable aryl groups are phenyl or diphenyl. Examples of suitable alkaryl groups are 4-methylphenyl (p-tolyl) or p-ethylphenyl. Examples of suitable aralkyl groups are benzyl or phenethyl. Suitable conjugated dienes of formula (1) used to polymerize the I polymer or random IB copolymer blocks are isoprene, 2,3-dimethylbutadiene, myrcene, 2-phenyl-1,3-butadiene, 2-hexyl-1,3-butadiene, 2-benzyl-1,3-butadiene, 2-p-tolyl-1,3-butadiene or mixtures thereof, preferably isoprene, myrcene or 2,3-dimethylbutadiene, and most preferably isoprene.

Suitable aryl-substituted olefins used to polymerize the S polymer blocks have the formula

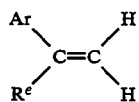

where Ar is phenyl, alkyl-substituted phenyl, naphthyl or alkyl-substituted naphthyl, and $R^e$ is hydrogen, methyl, ethyl, propyl, butyl or aryl. Examples of suitable aryl-substituted olefins are styrene, 2-phenyl alpha-olefins, such as alpha-methyl styrene, 1,1-diphenyl ethylene, alkylated styrenes, vinyl naphthalene, or any alkylated vinyl naphthalenes. Suitable alkyl substituents in the alkylated styrenes or alkylated vinyl naphthalenes are methyl, ethyl, propyl, tert-butyl and sec-butyl. Each of the alkylated styrenes or vinyl naphthalenes may contain one or more alkyl substituents. Preferred aryl-substituted olefins are styrene, vinylnapthalene, alpha-methyl styrene, vinyltoluene and diphenylethylene.

The weight average molecular weight ($M_w$) of the block copolymers of this invention may be, for example, in the range of about 30K to $1.5 \times 10^6$ (where K=1000), preferably about 60K to $10^6$ and more preferably about 75K to 500K, while the number average molecular weight ($M_n$) may be, for example, in the range of about 20K to $10^6$, preferably about 40K to 750K, and more preferably about 75K to 500K.

Although the block copolymers of this invention have been exemplified by triblock copolymer (a), and pentablock copolymers (b) and (c) as described hereinbefore, such block copolymers may contain a larger number of blocks as long as one of the two conditions of the invention are met, viz., 1) that the terminal blocks are random IB copolymer and that there is at least one middle or interior S polymer block, or 2) that there are terminal I polymer blocks and at least one each of interior butadiene (B) polymer and S polymer blocks. Such copolymers with a larger number of blocks may contain I polymer or random IB polymer blocks in the interior of the backbone of a linear copolymer or the branches of a star-branched copolymer so as to allow cross-linking to take place in the interior as well as the ends of the backbone or branches, with a controlled large distance between the cross-links of the block copolymer. However, the described triblock copolymer (a) and pentablock copolymers (b) and (c) are preferred. In any case, it is important to have the block copolymer terminated at each end with the I polymer or IB random copolymer blocks to assure that there are unsaturated groups at each end of the block copolymer enabling the block copolymer to be cross-linked or functionalized at the terminal ends thereof. The term "functionalized" is used herein to describe chemical modifications of the unsaturated groups to produce functional groups, the nature of which is described in detail below. The cross-linking of the functionalized and nonfunctionalized copolymer chains is conducted in a conventional manner and is described below.

After the block copolymer is polymerized, it is subjected to a selective hydrogenation reaction during which the polymerized butadiene units of the block copolymer are selectively hydrogenated to such an extent that they contain substantially none of the original unsaturation, while the polymerized I units retain a sufficient amount of their original unsaturation to cure the block copolymer. Generally, for a block copolymer wherein the I units are polymerized from any of the monomers discussed above, the Iodine Number for the I units after the selective hydrogenation reaction is about 10 to about 100%, preferably about 25 to about 100%, more preferably about 50 to about 100%, and most preferably about 100% of the Iodine Number prior to the selective hydrogenation reaction, and for the polymerized butadiene (B) blocks it is about 0 to about 10%, preferably about 0 to about 0.5%, of the Iodine Number prior to the selective hydrogenation reaction. The Iodine Number, as is known to those skilled in the art, is defined as the theoretical number of grams of iodine which will add to the unsaturation in 100 grams of olefin and is a quantitative measurement of unsaturation.

In the block copolymers of the invention, although the microstructure of the polymerized I units is not critical and may consist of any combination of 1,2-, 3,4- and 1,4-units, schematically represented below for the polyisoprene blocks, when a polar compound is used during the polymerization of the I unit, the I units comprise primarily (at least about 80%) 3,4-units, the remainder being primarily (about 20%) 1,2-units; when the polar compound is not used during the polymerization of the I unit, the I units comprise primarily (about 80%) 1,4-units, the remainder being primarily 1,2- and 3,4-units.

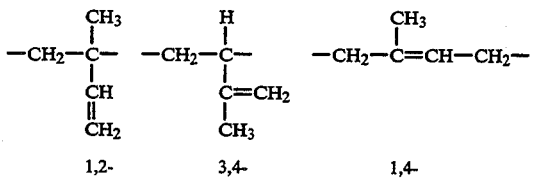

As discussed above, the microstructure of the butadiene polymer blocks should be a mixture of 1,4- and 1,2-units indicated hereinbefore, since the hydrogenation of the predominantly 1,4-microstructures produces a crystalline polyethylene segment. The microstructure of the I and butadiene polymer blocks in the embodiments utilizing such blocks (as well as of the polymerized I dienes or butadiene in any polymers of this invention) is controlled in a conventional manner, e.g., by controlling the amount and nature of the polar compounds used during the polymerization reaction, and the reaction temperature. In one particularly preferred embodiment, the polybutadiene block contains about 55% of the 1,2- and about 45% wt. of the 1,4-microstructure. The hydrogenation of the butadiene polymer block containing about 50 to about 60% wt. of the 1,2-microstructure content produces an elastomeric interior block which is substantially an ethylene-butene-1 copolymer having substantially no crystallinity. The reduction of the 1,2-content microstructure in the polybutadiene block in a controlled manner permits the introduction of controlled levels of crystallinity into the hydrogenated polybutadiene block which provides a "green" (unvulcanized) strength necessary in certain applications.

The terms 1,2-, 1,4-, and 3,4-microstructure or units as used in this application refer to the products of polymerization obtained, respectively, by the 1,2-, 1,4- and 3,4-, additions of monomer units into the growing polymer chain.

We surprisingly discovered than the polymerized 1,4- and 1,2- butadiene units of the polymers of this invention are selectively hydrogenated in our hydrogenation process much faster than the polymerized conjugated dienes of formula (1), e.g., the I units. This is not evident from the teachings of Falk, discussed above, because Falk teaches that double bonds of the disubstituted 1,4-polybutadiene units are hydrogenated selectively in the presence of double bonds of the trisubstituted 1,4-polyisoprene units (which are not hydrogenated). We surprisingly discovered that the disubstituted double bonds of the 1,4-polybutadiene units are hydrogenated along with the monosubstituted double bonds of the 1,2-polybutadiene units, while the disubstituted double bonds of the 3,4-polyisoprene units are hydrogenated at a much slower rate than the aforementioned butadienes. Thus, in view of Falk's disclosure it is surprising that the disubstituted double bonds of the 1,4-polybutadiene units are hydrogenated selectively in the presence of the disubstituted double bonds of the 3,4-polyisoprene units. This is also surprising in view of the teachings of Hoxmeier, Published European Patent Application, Publication No. 0 315 280, who discloses that the disubstituted double bonds of the 1,4-polybutadiene units, monosubstituted double bonds of the 1,2-polybutadiene units and disubstituted double bonds of the 3,4-polyisoprene units are hydrogenated simultaneously at substantially the same rates. For example, for the block copolymers of this invention, wherein the I block is polyisoprene, Fourier transform infrared (FTIR) analysis of selectively hydrogenated triblock polymers indicates that the hydrogenation of the double bonds of the 1,2-polybutadiene units proceeds most rapidly, followed by the hydrogenation of the double bonds of the 1,4-polybutadiene units. Infrared absorptions caused by these groups disappear prior to appreciable hydrogenation of the polyisoprene units.

As stated, after the block copolymer is prepared, it is subjected to a selective hydrogenation reaction to hydrogenate primarily the polymerized butadiene units of each of the interior polybutadiene blocks or the random IB copolymer blocks. The selective hydrogenation reaction and the catalyst are described in detail below. After the hydrogenation reaction is completed, the selective hydrogenation catalyst is removed from the block copolymer, and the polymer is isolated by conventional procedures, e.g., alcohol flocculation, steam stripping of solvent or non-aqueous solvent evaporation. An anti-oxidant, e.g., Irganox 1076 (from Ciba-Geigy), is normally added to the polymer solution prior to polymer isolation.

The isolated polymer is vulcanizable through the unsaturated end units I by a number of well known processes utilized currently for thermosetting hydrocarbon elastomers. Such processes are detailed in RUBBER TECHNOLOGY, THIRD EDITION, VAN NOSTRAND REINHOLD COMPANY, New York, 1987, Maurice Morton, Editor, chapters 2,9 and 10, incorporated herein by reference.

As stated, the star-branched block copolymers of this invention comprise either 1) a combination of random copolymer blocks $(I_xB_y)$ and polymer blocks $(S_z)$ wherein the free end (i.e., uncoupled end) of each branch of the copolymer is a random copolymer block $(I_xB_y)$; or 2) a combination of polymer blocks $(I_x)$, $(B_y)$ and $(S_z)$ wherein the free end of each branch is a polymer block $(I_x)$. Since each branch of the star-branched copolymer has only a single end, the advantages of the invention obtained as a result of unsaturated Polymerized I units in the terminal blocks may be obtained by utilizing half the structure of triblock polymer (a) or pentablock polymers (b) and (c) as each branch of the star-branched polymer. Thus, one type of preferred polymer has branches composed of two blocks, viz., an outermost random IB copolymer block and an interior S polymer block; a second preferred branch has branches composed of three blocks, viz., an outermost I polymer block, a central butadiene polymer block and an innermost S polymer block; and a third preferred polymer has branches also composed of three blocks, viz., an outermost I polymer block, a central S polymer block and an innermost butadiene polymer block. The relative percentages and the ranges of numbers of each type of unit, viz., the total sums of each of x, y and z, are similar to the values for the preferred triblock copolymer (a) and pentablock copolymers (b) and (c) previously described. Furthermore, the selective hydrogenation and resulting reduction in iodine numbers of the star-branched block copolymers are also similar to those of linear polymers (a), (b) and (c) set out hereinbefore.

The block copolymers of this invention having a particularly large number of polymerized I units in the terminal I polymer or IB random copolymer blocks (i.e., containing 100–200 monomer units) have an increased vulcanization rate, as compared to those containing a smaller number of I units in the terminal blocks, and are co-vulcanizable with diene rubbers available in the art, e.g., polybutadiene and natural rubbers. The block polymers containing such large I blocks can be blended with diene rubbers by conventional methods and subsequently vulcanized to produce novel compositions of this invention. The resulting materials are expected to have increased oxidation and ozone degradation resistance as compared to known diene rubbers alone, and therefore are expected to be valuable materials for the production of white sidewalls of tires and similar articles.

In all embodiments of the invention, mixtures of I conjugated dienes may be used to form the I polymer blocks or the IB random copolymer blocks of the contemplated block copolymers, and mixtures of S aryl-substituted olefins may be used to prepare the S polymer blocks of such block copolymers. Accordingly, whenever a reference is made herein to an I conjugated diene, or an S aryl-substituted olefin, it may encompass more than one of each type of monomer or polymerized monomeric unit.

While the block copolymers of this invention have been described primarily in terms of polymerized I, butadiene and S units in the various blocks, it is to be understood that controlled minor amounts of other monomers may be used when preparing such blocks. Thus, a minor amount (e.g., about 0.1 to about 30 mole %) of an S-type aryl-substituted olefin, e.g., styrene or other suitable monomers (such as alkylated styrene, vinyl naphthalene or alkylated vinyl naphthalene), may be incorporated in the I, B or random IB blocks for further control of glass transition temperature (Tg), density, solubility parameters and refractive index. Similarly, the scope of this embodiment also encompasses polymers wherein the various blocks may be comprised of the described polymers of I, butadiene and S, or a mixture of I type monomers and butadiene and a minor amount of any other anionically polymerizable monomer capable of polymerizing with such indicated monomers.

it will be apparent to those skilled in the art that proper choice of polymerization parameters can produce polymers with a great variety of compositional and structural differences, falling within the scope of our invention. For example, changes in composition of the interior butadiene polymer blocks or the polymerized butadiene units in the random IB copolymer blocks control the nature of the rubbery properties while changes in the I polymer terminal blocks or the polymerized I units in the IB random copolymer terminal blocks permit response to different vulcanizing agents, e.g., sulfur-based cure systems and phenolic resin cure systems.

Blends Of Inventive Polymers With Other Materials

The block copolymers of this invention can be blended with other rubbers, in which case the degree of unsaturation of the copolymers of the invention can be adjusted so that the vulcanization rate of the two materials is substantially the same. Suitable rubbers which can be blended with the copolymers of this invention are EPDM, butyl rubber and rubbers based on butadiene or isoprene.

The block copolymers of this invention can also be blended with plastics, e.g., isotactic polypropylene, polystyrene, polyethylene, Nylon, polycarbonates, polyesters and styrene-acrylonitrile resins. Thermoplastic elastomers having excellent properties can be obtained by dynamically vulcanizing a blend of polypropylene and the elastomers of our invention, in which the elastomers are cross-linked to a very high degree. A commercial material, Santoprene (trademark of and produced by Monsanto Chemical Co.) is based upon blends of polypropylene and EPDM. Details of the preparation and properties of such blends are presented in THERMOPLASTIC ELASTOMERS, A COMPREHENSIVE REVIEW, edited by N. R. Legge et al., Chapter 7, Hanser Publishers, Munich, Vienna and New York (1987), the contents of which are incorporated herein by reference. Such dynamically vulcanized blends prepared with the polymers of the invention a conventional manner, e.g., that of N. R. Legge et al., wherein the polymers of this invention are blended with polypropylene, and most particularly wherein the linear triblock and pentablock polymers of this invention are blended with polypropylene, can provide thermoplastic elastomers with unique elastomeric properties.

The block copolymers of this invention can be compounded with ingredients known to those skilled in the art, e.g., fillers such as silica, carbon block, extender oils, anti-oxidants, tackifying agents, vulcanizing agents and similar materials.

Polymerization Reaction

The block copolymers of this intention are polymerized by any known block polymerization processes, preferably by an anionic polymerization process. Anionic polymerization is well known in the art, and it is utilized in the production of a variety of commercial polymers. An excellent comprehensive review of the anionic polymerization processes appears in the text ADVANCES IN POLYMER SCIENCE 56, ANIONIC POLYMERIZATION, pp. 1-90, Springer-Verlag, Berlin, Heidelberg, New York, Tokyo 1984 in a monograph entitled ANIONIC POLYMERIZATION OF NON-POLAR MONOMERS INVOLVING LITHIUM, by R. N. Young, R. P. Quirk and L. J. Fetters, incorporated herein by reference. The anionic polymerization process is conducted in the presence of a suitable anionic catalyst (also known as an initiator), such as n-butyl-lithium, sec-butyl-lithium, t-butyl-lithium, sodium naphthalide or cumyl potassium. The amount of the catalyst and the amount of the monomer in the polymerization reaction dictate the molecular weight of the polymer. The polymerization reaction is conducted in solution using an inert solvent as the polymerization medium, e.g., aliphatic hydrocarbons, such as pentane, hexane, cyclohexane or heptane, or aromatic solvents, such as benzene or toluene. In certain instances, inert polar solvents, such as tetrahydrofuran, can be used alone as a solvent, or in a mixture with a hydrocarbon solvent.

The block polymerization process will be exemplified below for the polymerization of a preferred embodiment of the invention, pentablock copolymer (b) wherein monomer I is isoprene and monomer S is styrene. However, it will be apparent to those skilled in the art that the same process principles can be used for the polymerization of all copolymers of the invention.

The process, when using a lithium-based catalyst, comprises forming a solution of the isoprene monomer in an inert hydrocarbon solvent, such as cyclohexane, modified by the presence therein of one or more polar compounds selected from the group consisting of ethers, thioethers and tertiary amines, e.g., tetrahydrofuran. The polar compounds are necessary to control the microstructure of the butadiene polymer interior blocks, i.e., the content of the 1,2-structure thereof. The higher the content of the polar compounds, the higher will be the content of the 1,2-structure in these blocks. Since the presence of the polar compound is not essential in the formation of the first polymer block with many initiators unless a high 3,4-structure content of the first block is desired, it is not necessary to introduce the polar compound at this stage, since it may be introduced just prior to or together with the addition of the butadiene in the second polymerization stage. Examples of polar compounds which may be used are dimethyl ether, diethyl ether, ethyl methyl ether, ethyl propyl ether, dioxane, diphenyl ether, tripropyl amine, tributyl amine, trimethyl amine, triethyl amine, and N-,N-,N'-,N'-tetramethyl ethylene diamine. Mixtures of the polar compounds may also be used. The amount of the polar compound depends on the type of the polar compound and the polymerization conditions as will be apparent to those skilled in the art. The effect of the polar compounds on the polybutadiene microstructure is detailed in ANTKOWIAK etal., TEMPERATURE AND CONCENTRATION EFFECTS ON POLAR-MODIFIED ALKYL LITHIUM POLYMERIZATIONS AND COPOLYMERIZATIONS, JOURNAL OF POLYMER SCIENCE: Part A-1, Vol. 10, 1319-1334 (1972), incorporated herein by reference. The polar compounds also accelerate the rate of polymerization.

When the alkyl lithium-based initiator, a polar compound, and an isoprene monomer are combined in an inert solvent, polymerization of the isoprene proceeds to produce the first terminal block whose molecular weight is determined by the ratio of the isoprene to the initiator. The "living" polyisoprenyl anion formed in this first step is utilized as the catalyst for further polymerization. At this time, butadiene monomer is introduced into the system and block polymerization of the second block proceeds, the presence of the polar compound now influencing the desired degree of branching (the 1,2-structure content) in the polybutadiene block. The resulting product is a living diblock polymer having a terminal anion and a lithium counterion. The living diblock polymer serves as a catalyst for the growth of the central polystyrene block, formed when styrene monomer is added to the reaction vessel to produce the central polymer block, resulting in the formation of a living I-B-S triblock. Two further steps of monomer addition are carried out, first with the butadiene and then with isoprene. Upon completion of polymerization, the living anion, now present at the terminus of the pentablock, is destroyed by the addition of a proton donor, such as methyl alcohol or acetic acid. The polymerization reaction is usually conducted at a temperature of between 0° C. and about 100° C., although higher temperatures can be used. Control of a chosen reaction temperature is desirable since it can influence the effectiveness of the polar compound additive in controlling the polymer microstructure. The reaction temperature can be, for example, from 50° to 80° C. The reaction pressure is not critical and varies from atmospheric to about 100 psig. If the polar compounds are utilized prior to the polymerization of the first living I polymer, I polymer blocks with high 3,4-unit content are formed. If polar compounds are added after the initial living I polymer is prepared, the first I polymer block will possess a high percentage of 1,4-microstructure (which is trisubstituted), and the second I polymer block will have a high percentage of 3,4-microstructure.

The production of pentablock polymers (b) having a high 1,4-unit content on both of the terminal I blocks is also possible by the use of coupling techniques. Thus, isoprene may be contacted with an RLi anionic catalyst in the absence of a polar compound to obtain a living 1,4-isoprene polymer, which may then be contacted with butadiene-1,3 and a polar compound to obtain a living diblock copolymer consisting of a 1,4-polyisoprene block and a polybutadiene block containing both 1,2- and 1,4-microstructures. The latter living diblock polymer may then be contacted with the amount of styrene desired in the final pentablock copolymer to obtain a living 1,4-polyisoprene-polybutadiene-polystyrene triblock copolymer which is then contacted with a coupling agent to obtain the desired 1,4-polyisoprene-polybutadiene-polystyrene-polybutadiene-1,4-polyisoprene pentablock copolymer.

The substitution of myrcene for the isoprene during the polymerization of the I polymer block insures the incorporation of a high proportion of trisubstituted double bonds, even in the presence of polar compounds since myrcene contains a pendant trisubstituted double bond which is not involved in the polymerization process. In a coupling process similar to that described above, block polymers containing polyisoprene end blocks (or any other polymerized monomer suitable for use in the I polymer block) having a high 3,4-microstructure content can be obtained by adding the polar compound prior to the isoprene (or another monomer) polymerization.

The use of the coupling technique for the production of triblock and pentablock polymers greatly reduces the reaction time necessary for the completion of polymerization, as compared to a sequential addition of monomers utilized to prepare each block. Such coupling techniques are well known and utilize coupling agents, such as esters, $CO_2$, iodine, dihaloalkanes, silicon tetrachloride, divinyl benzene, alkyltrichlorosilanes and dialkyldichlorosilanes. The use of tri- or tetra-functional coupling agents, such as alkyltrichlorosilanes or silicon tetrachloride, permits the formation of macromolecules having 1- or 2- main chain branches, respectively. The addition of divinyl benzene as a coupling agent has been documented to produce molecules having up to 20 or more separately joined segments.

The use of some of the coupling agents provides a convenient means of producing star-branched block polymers. The star-branched block polymers are made from any combination of blocks I, B and S or random IB and S, discussed above, providing that each free end (i.e., uncoupled end) of the star-branched polymer is either an I or a random IB block, respectively. The molecular weight of the star-branched block copolymers will depend on the number of branches in each such copolymer, as will be apparent to those skilled in the art.

Suitable coupling agents and reactions are disclosed in the following references which are incorporated herein by reference: U.S. Pat. Nos. 3,949,020; 3,594,452; 3,598,887; 3,465,065; 3,078,254; 3,766,301; 3,632,682; 3,668,279; and British patents 1,014,999; 1,074,276; 1,121,978.

Selective Hydrogenation

The selective hydrogenation reaction will also be described below using a pentablock polymer (b) as an example. However, it will be apparent to those skilled in the art that any polymers of this invention can be selectively hydrogenated in the same manner.

The block copolymer is selectively hydrogenated to saturate the interior polybutadiene blocks of each of the pentablocks. The method of selectively hydrogenating the polybutadiene block is similar to that of Falk, "Coordination catalysts For The Selective Hydrogenation of Polymeric Unsaturation", JOURNAL OF POLYMER SCIENCE: PART A-1, Volume 9, 2617-2623 (1971), but it is conducted with the novel hydrogenation catalyst and process used herein. Any other known selective hydrogenation methods may also be used, as will be apparent to those skilled in the art, but it is preferred to use the method described herein. In summary, the selective hydrogenation method preferably used herein comprises contacting the previously prepared block copolymer with hydrogen in the presence of the novel catalyst composition.

The novel hydrogenation catalyst composition and hydrogenation process are described in detail in application Ser. No. 07/466,136, filed Jan. 16, 1990, by T. S. Coolbaugh et al. The hydrogenation catalyst composition is synthesized from at least one transition metal compound and an organometallic reducing agent.

Suitable transition metal compounds are compounds of metals of Group IVb, Vb, VIb, or VIII, preferably IVb or VIII of the Periodic Table of the Elements, published in LANGE's HANDBOOK OF CHEMISTRY (13th Edition, 1985, McGraw-Hill Book Company, New York, John A. Dean, Editor). Non-limiting examples of such compounds are metal halides, e.g., titanium tetrachloride, vanadium tetrachloride; vanadium oxytrichloride, titanium and vanadium alkoxides, wherein the alkoxide moiety has a branched or unbranched alkyl radical of 1 to about 20 carbon atoms, preferably 1 to about 6 carbon atoms. Preferred Transition metal compounds are metal carboxylates or alkoxides of Group IVb or VIII of the Periodic Table of the Elements, such as nickel (II) 2-ethylhexanoate, titanium isopropoxide, cobalt (II) octoats, nickel (II) phenoxide and ferric acetylacetonate.

The organometallic reducing agent is any one or a combination of any of the materials commonly employed to activate Ziegler-Natta olefin polymerization catalyst components containing at least one compound of the elements of Groups Ia, IIa, IIb, IIIa, or IVa of the Periodic Table of the Elements. Examples of such reducing agents are metal alkyls, metal hydrides, alkyl metal hydrides, alkyl metal halides, and alkyl metal alkoxides, such as alkyllithium compounds, dialkylzinc compounds, trialkylboron compounds, trialkylaluminum compounds, alkylaluminum halides and hydrides, and tetraalkylgermanium compounds. Mixtures of the reducing agents may also be employed. Specific examples of useful reducing agents include n-butyl-lithium, diethylzinc, di-n-propylzinc, triethylboron, diethylaluminumethoxide, triethylaluminum, trimethylaluminum, triisobutylaluminum, tri-n-hexylaluminum, ethylaluminum dichloride, dibromide, and dihydride, isobutyl aluminum dichloride, dibromide, and dihydride, diethylaluminum chloride, bromide, and hydride, di-n-propylaluminum chloride, bromide, and hydride, diisobutylaluminum chloride, bromide and hydride, tetramethylgermanium, and tetraethylgermanium. Organometallic reducing agents which are preferred are Group IIIa metal alkyls and dialkyl metal halides having 1 to about 20 carbon atoms per alkyl radical. More preferably, the reducing agent is a trialkylaluminum compound having 1 to about 6 carbon atoms per alkyl radical. Other reducing agents which can be used herein are disclosed in Stevens etal., U.S. Pat. No. 3,787,384, column 4, line 45 to column 5, line 12 and in Strobel et al., U.S. Pat. No. 4,148,754, column 4, line 56 to column 5, line 59, the entire contents of both of which are incorporated herein by reference. Particularly preferred reducing agents are metal alkyl or hydride derivatives of a metal selected from Groups Ia, IIa and IIIa of the Periodic Table of the Elements, such as n-butyl-lithium, sec-butyl-lithium, n-hexyl-lithium, phenyl-lithium, triethylaluminum, tri-isobutylaluminum, trimethylaluminum, diethylaluminum hydride and dibutylmagnesium.

The molar ratio of the metal derived from the reducing agent to the metal derived from the transition metal compound will vary for the selected combinations of the reducing agent and the transition metal compound, but in general it is about 1:1 to about 12:1, preferably about 1.5:1 to about 8:1, more preferably about 2:1 to about 7:1 and most preferably about 2.5:1 to about 6:1. It will be apparent to those skilled in the art that the optimal ratios will vary depending upon the transition metal and the organometallic agent used, e.g., for the trialkylumium/nickel(II) systems the preferred aluminum: nickel molar ratio is about 2.5:1 to about 4:1, for the trialkylaluminum/cobalt(II) systems the preferred aluminum: cobalt molar ratio is about 3:1 to about 4:1 and for the trialkylaluminum/titanium (IV) alkoxides systems, the preferred aluminum: titanium molar ratio is about 3:1 to about 6:1.

The mode of addition and the ratio of the reducing agent to the transition metal compound are important in the production of the novel hydrogenation catalysts having superior selectivity, efficiency and stability, as compared to prior art catalytic systems. During the synthesis of the hydrogenation catalysts it is preferred to maintain the molar ratio of the reactants used to synthesize the catalyst substantially constant. This can be done either by the addition of the reducing agent as rapidly as possible to a solution of the transition metal compound, or by a substantially simultaneous addition of the separate streams of the reducing agent and the transition metal compound to a catalyst synthesis vessel in such a manner that the selected molar ratios of the metal of the reducing agent to the metal of the transition metal compound are maintained substantially constant throughout substantially the entire time of addition of the two compounds. The time required for the addition must be such that excessive pressure and heat build-up are avoided, i.e., the temperature should not exceed about 80° C. and the pressure should not exceed the safe pressure limit of the catalyst synthesis vessel.

In a preferred embodiment, the reducing agent and the transition metal compound are added substantially simultaneously to the catalyst synthesis vessel in such a manner that the selected molar ratio of the reducing agent to the transition metal compound is maintained substantially constant during substantially the entire time of the addition of the two compounds. This preferred embodiment permits the control of the exothermic reaction so that the heat build-up is not excessive, and the rate of gas production during the catalyst synthesis is also not excessive: accordingly, the gas build-up is relatively slow. In this embodiment, carried out with or without solvent diluent, the rate of addition of the catalyst components is adjusted to maintain the synthesis reaction temperature at or below about 80° C., which promotes the formation of the selective hydrogenation catalyst. Furthermore, the selected molar ratios of the metal of the reducing agent to the metal of the transition metal compound are maintained substantially constant throughout the entire duration of the catalyst preparation when the simultaneous mixing technique of this embodiment is employed.

In another embodiment, the catalyst is formed by the addition of the reducing agent to the transition metal compound. In this embodiment, the timing and the order of addition of the two reactants is important to obtain the hydrogenation catalyst having superior selectivity, efficiency and stability. Thus, in this embodiment, it is important to add the reducing agent to the transition metal compound in that order in as short a time period as practically possible. In this embodiment, the time allotted for the addition of the reducing agent to the transition metal compound is critical for the production of the catalyst. The term "as short a time period as practically possible" means that the time of addition is as rapid as possible, such that the reaction temperature is not higher than about 80° C. and the reaction pressure does not exceed the safe pressure limit of the catalyst synthesis vessel. As will be apparent to those skilled in the art, that time will vary for each synthesis and will depend on such factors as the types of the reducing agents, the transition metal compounds and the solvents used in the synthesis, as well as the relative amounts thereof, and the type of the catalyst synthesis vessel used. For purposes of illustration, a solution of about 15 ml of triethylaluminum in hexane should be added to a solution of nickel(II) octoate in mineral spirits in about 10-30 seconds. Generally, the addition of the reducing agent to the transition metal compound should be carried out in about 5 seconds (sec) to about 5 minutes, depending on the quantities of the reagents used. If the time period during which the reducing agent is added to the transition metal compound is prolonged, e.g., more than 15 minutes, the synthesized catalyst is less selective, less stable and may be heterogeneous.

In the embodiment wherein the reducing agent is added as rapidly as possible to the transition metal compound, it is also important to add the reducing agent to the transition metal compound in the aforementioned sequence to obtain the novel catalyst. The reversal of the addition sequence, i.e., the addition of the transition metal compound to the reducing agent, or the respective solutions thereof, is detrimental to the stability, selectivity, activity and homogeneity of the catalyst and is therefore undesirable.

In all embodiments of the hydrogenation catalyst synthesis, it is preferred to use solutions of the reducing agent and the transition metal compound in suitable solvents, such as hydrocarbon solvents, e.g., cyclohexane, hexane, pentane, heptane, benzene, toluene or mineral oils. The solvents used to prepare the solutions of the reducing agent and of the transition metal compound may be the same or different, but if they are different, they must be compatible with each other so that the solutions of the reducing agent and the transition metal compound are fully soluble in each other.

The hydrogenation process comprises contacting the unsaturated polymer to be hydrogenated with an amount of the catalyst solution containing about 0.1 to about 0.5, preferably about 0.2 to about 0.3 mole percent of the transition metal based on moles of the polymer unsaturation. The hydrogen partial pressure is about 5 psi to about several hundred psi, but preferably it is about 10 to about 100 psi. The temperature of the hydrogenation reaction mixture is about 25 to about 80° C., since higher temperatures may lead to catalyst deactivation. The length of the hydrogenation reaction may be as short as 30 minutes and, as will be apparent to those skilled in the art, depends to a great extent on the actual reaction conditions employed. The hydrogenation process may be monitored by any conventional means, e.g., infra-red spectroscopy, hydrogen flow rate, total hydrogen consumption, or any combination thereof.

After the hydrogenation reaction is completed, the hydrogenation catalyst must be removed from the polymer, for example, by washing twice with equal volumes of 10% aqueous citric acid solution also containing 5% isopropanol at 60° C. The polymer solution is then water washed and the polymer isolated by conventional methods, e.g., steam or alcohol flocculation or solvent evaporation.

Cross-linking And Functionalization Of The Terminal Blocks

In addition to acting as sites for vulcanization, the unsaturated terminal blocks of the block polymers of this invention can be chemically modified to provide benefits obtained with similar modifications of existing commercial materials, such as butyl rubber or EPDM. In some instances, the benefits obtained by a chemical modification of butyl rubber or EPDM may be magnified using the elastomers of our invention as a matrix instead of the butyl rubber or EPDM because of their intrinsically superior elastomeric properties.

An example of such a chemical modification of the polymers of this invention is sulfonation of the olefinic unsaturation of the polymerized I units or polymerized dienes of formula (1) of any polymers of this invention containing the polymerized I units or polymerized dienes of formula (1), followed by neutralization of the thus formed polymeric sulfonic acid with metal ions or amines. When such a modification is performed on a commercial ethylene-propylene-diene monomer (EPDM) rubber, a thermoplastic elastomer which behaves like a vulcanized rubber at room temperature but can be shaped at higher temperatures is produced. A description of an example of a process for and product description of such a chemically modified EPDM can be found in IONS IN POLYMERS, Advances in Chemistry Series 187, American Chemical Society, Washington, D.C. 1980, pp. 3 -53, incorporated herein by reference. Following the procedures used for EPDM described in the aforementioned publication with the block copolymers of our invention, thermoplastic elastomers with greatly improved elongation properties were prepared.

It is known that the halogenation of the unsaturation in butyl rubber (based upon isoprene monomer) prior to the vulcanization treatment, produces dramatic changes in vulcanization rate and provides greater versatility in the choice of vulcanizing agents. Since the residual unsaturated groups in the block copolymers of our invention present in the polymerized I units may also be based on isoprene monomer, the halogenation of the polymer of this embodiment provides the same benefits, but with the retention of the greater elongation characteristics and resistance to cold flow inherent in the invention polymer. The same benefits will be obtained with any other dienes which can be used to prepare the I polymer or random IB copolymer blocks of the invention, and therefore any polymers of this invention containing any such dienes can be halogenated in the same manner as the butyl rubber. Any other polymers of this invention containing the polymerized dienes of formula (1) or polymerized I units can also be halogenated in the same manner.

It is also known that the reaction of EPDM with maleic anhydride at elevated temperatures (e.g., about 150° C. to about 250° C.) produces maleic modified EPDM which is used commercially as an impact modifier, particularly for Nylon. Similar modification of the polymers of any embodiments of our invention occurs readily, since the residual isoprene unsaturation, primarily of the illustrated 2,4-type, is more reactive with maleic anhydride than are the internal bonds found in EPDM. The resultant impact modifier, because of its greater elongation, provides superior properties when blended with Nylon.

EPDM polymers which have been modified with polar functionality are utilized as dispersant type viscosity index improvers in multigrade lubricants. A great number of patents are devoted to such modifications. Any of the modifications performed on EPDM for this purpose can be performed with the polymers of this invention. Typical modifications which can be used with the polymers of this invention are described in: U.S. Pat. Nos. 3,099,644; 3,257,349; 3,448,174; 3,997,487; 3,870,841: 3,642,728: 3,847,854; 3,437,556; 4,557,849; 4,032,700; 3,899,434; 4,557,847; 4,161,452; 4,170,562; 4,517,104; 4,320,017; 4,502,972; 4,098,710; 4,007,121; 4,011,380; 4,033,888; 4,145,298; 4,402,844; 4,146,489 and British patent 1,072,796, the disclosures of all of which are incorporated herein by reference.

The above examples illustrate only some of the potentially valuable chemical modifications of the polymers of this invention. The high molecular weight block polymers of this invention, providing a means for a wide variety of chemical modifications only at the ends of the molecule (i.e., at the I polymer or random IB copolymer blocks only), present the opportunity to prepare materials previously impossible because of the lack of availability of such polymers. Some examples of well known chemical reactions which can be performed on polymers of this invention are found in E. M. FETTES, CHEMICAL REACTIONS OF POLYMERS, High Polymers, Vol. 19, John Wiley, New York, 1964, incorporated herein by reference.

Our invention provides block hydrocarbon polymers capable of being vulcanized to a perfect network with a distance between cross-links substantially equivalent to the dimensions of the unvulcanized elastomeric molecule. In addition to the expected improvements in elastomeric properties, the saturated main chain of the polymers of our invention provides a high degree of oxidative and thermal stability. Unique materials can also be obtained by chemical modifications of the block polymers of this invention, since such modifications can be carried out selectively only at the unsaturated terminal ends of the molecules.

The cross-linking of the selectively hydrogenated block polymers of this invention is conducted in a conventional manner by contacting the block copolymer with a suitable cross-linking agent or a combination of such agents. The cross-linking process produces a copolymer having uniform distance between cross-links.

The block copolymers can also be functionalized by reacting the terminal blocks containing unsaturated groups with various reagents to produce functional groups, such as hydroxyl, epoxy, sulfonic acid, mercapto, acrylate or carboxyl groups. Functionalization methods are well known in the art.

The block copolymers, including the star-branched polymers, of this invention can be used in a variety of applications, e.g., to produce electrical insulation, pressure sensitive adhesives, sealants, rubberized asphalts, in automotive applications, e.g., hoses, tubing, weather-stripping, in construction industry, e.g., to produce gaskets, rubber sheeting for roofing, pond and ditch liners, and in many other applications.

The following examples further illustrate additional features of the invention. However, it will be apparent to those skilled in the art that the specific reactants and reaction conditions used in the Examples do not limit the scope of the invention.

In all of the following examples, the experimental work was performed with dried reactors and equipment and under strictly anaerobic conditions. Extreme care must be used to exclude air, moisture and other impurities capable of interfering with the delicate chemical balance involved in the synthesis of the polymers of this invention, as will be apparent to those skilled in the art.

EXAMPLE 1

This example illustrates the preparation of a polymer of the type of triblock copolymer (a) having the structure isoprene/butadiene random copolymer-polystyrene-isoprene/butadiene random copolymer.

Into a small stirred pressure reactor were added 200 grams of pentane, 4.5 ml of THF, 7.0 ml of isoprene, 30.4 g of butadiene and 3 mg of dry bipyridyl. The mixture was titrated to an orange color using 1.6 moles n-butyllithium and an additional 0.63 ml of catalyst were then added to cause polymerization. After one hour of reaction (polymerization) at 60° C., 5.3 ml. of styrene (4.82 g) were introduced to the flask. The mixture was allowed to react for one hour at 60° C. and then 2.2 ml of a 0.5 molar solution of phenylbenzoate were added to couple the living polymer chains. A portion of polymer was quenched with acetic acid and flocculated by pouring the solution into isopropanol containing anti-oxidant. After vacuum drying, the resultant polymer was shown to have a number average molecular weight ($M_n$) of 70,000. The unhydrogenated polymer possessed a 55% vinyl content from the butadiene portion.

EXAMPLE 2

This example illustrates the selective hydrogenation of the polymerized butadiene units in the random isoprene/butadiene copolymer blocks of the triblock copolymer of Example 1.

Pentane in an amount of 300 ml containing 40 grams of dissolved triblock polymer as prepared in Example 1 was introduced into a PARR shaker hydrogenation apparatus. This amount of polymer represents 0.56 moles of polybutadiene unsaturation. The hydrogenation catalyst was prepared by adding 10.8 ml of a nickel octoate solution (6% by weight nickel) to a solution of 45.2 millimoles of triethyl aluminum in 102.2 ml of hexane. The nickel octoate was added slowly (over about 1 hour) using a syringe pump to give a final catalyst solution which was 0.1 molar in nickel and had an Al/Ni molar ratio of 3.6/1.0. The shaker apparatus was purged 4 times with hydrogen gas, sealed, heated and pressured to 50 psig with hydrogen. Temperature was maintained at 50° C. and the reaction vessel was shaken for about four hours. Analysis of an aliquot of the product by FTIR demonstrated complete loss of absorption related to the 1,2-butadiene (910 and 994 $cm^{-1}$) and trans 1,4-butadiene (967 $cm^{-1}$), but retention of absorption related to 3,4-isoprene (vinylidene) structure (888 $cm^{-1}$). The reaction mixture was degassed and treated with 3–4 drops of Jeffamine D-2000 (a polyether diamine) and 1 ml of HCl (6N). After stirring for a short time, the dark catalyst color had discharged and the solution was added to 200 ml of isopropanol containing an anti-oxidant (0.5 g of Irganox 1076). The precipitated polymer was isolated and dried in a vacuum oven. Analysis of the polymer indicated essentially no residual nickel (less than 1 ppm).

The selectively hydrogenated triblock copolymer of this example was calculated to have 60 residual vinylidene double bonds and only 9 residual trans double bonds per chain. The cold flow of this polymer was found to be much reduced when compared with that of a selectively hydrogenated random copolymer having a number average molecular weight of 82,000 prepared from the same mix of isoprene and butadiene as described in Example 1 but without the central polystyrene block.

EXAMPLE 3

This example illustrates the preparation of a polymer of the type of pentablock copolymer (b) having the structure polyisoprene-polybutadiene-polystyrene-polybutadiene-polyisoprene The reactor was a two-quart glass bowled stirred pressure vessel equipped with an air-driven stirrer, a pressure gauge, a thermometer well, a heat exchange coil, a top surface inlet valve, a dip tube feeder with valve, a syringe injection port containing a Viton rubber gasket and a blow-out disk (200 psi). To the reactor was added, in sequence, 1100 ml of n-pentane, 6.5 ml of dry THF, 12.8 ml of isoprene and 1.0 ml of 0.01 molar solution of dipyridyl in pentane. The reactor was heated to 55° C. under slight nitrogen pressure. The contents of the reactor were titrated with a 1.7 molar solution of t-butyllithium until a persistent yellow-orange color was obtained. Next, 1.3 ml of 1.7 molar t-butyllithium was added and the polymerization was allowed to proceed for two hours. To the formed polyisoprenyl anion was added, over a short period of time, 84.4 grams of 1,3-butadiene. After an hour the pressure had dropped signifying essentially complete polymerization of the polybutadiene block. To this diblock anion was added 13.2 ml of pre-purified styrene. The reaction was allowed to proceed an additional hour. After this time, 2.3 ml of a 0.5 molar solution of dimethyldichlorosilane was added in order to couple the living polymer chains. After 30 minutes at 55° C., the reaction was quenched by the addition of excess acetic acid and flocculation by pouring into an equal volume of isopropanol containing anti-oxidant. After drying overnight in a vacuum oven at 50° C., the polymer was analyzed by GPC and shown to have a $M_n$ and $M_w$ respectively of 105,000 and 116,000.

The polymer is selectively hydrogenated as described in Example 2 to substantially completely hydrogenate (99.6%) the polybutadiene blocks while allowing sufficient unsaturation (57 vinylidene double bonds per chain) in the polyisoprene blocks so that the polymer could be vulcanized to near network perfection. The unvulcanized polymer had greatly improved resistance to cold flow as compared to a similar polymer but without the central polystyrene block, i.e., a polyisoprene-polybutadiene-polyisoprene triblock copolymer.

In addition to excellent resistance to cold flow, the unvulcanized polymers of Examples 1 and 2 as well as the other unvulcanized polymers of this invention have excellent oxidative, thermal and pyrolytic stability.

After vulcanization, the polymers of the invention also have excellent elasticity at elevated temperatures and a high degree of resistance to solvents.

It will be apparent to those skilled in the art that the specific embodiments discussed above can be successfully repeated with ingredients equivalent to those generically or specifically set forth above and under variable process conditions.

From the foregoing specification, one skilled in the art can readily ascertain the essential features of this invention and without departing from the spirit and scope thereof can adapt it to various diverse applications.

We claim

1. A blend comprising a selectively hydrogenated solid elastomeric block copolymer and a material selected from the group consisting of isotactic polypropylene, polystyrene, polyethylene, nylon, polycarbonates, polyesters, styrene-acrylonitrile resins, ethylene-propylene-diene rubber (EPDM), butyl rubber, and rubbers based on butadiene or isoprene, said block copolymer being such that either 1) the terminal blocks are polymers of at least one conjugated diene I, which contains at least five carbon atoms with at least one of each pair of double-bonded carbon atoms in the polymerized diene I units being additionally single-bonded to two carbon atoms, at least one middle or interior block is a butadiene polymer, and at least one middle or interior block is a polymer of at least one aryl-substituted olefin S; or 2) the terminal blocks are random copolymers IB of at least one diene I and butadiene (B), and at least one middle or interior block is a polymer of at least one aryl-substituted olefin S, said butadiene polymer or random IB copolymer blocks containing below about 10% of polyethylene crystallinity after hydrogenation, said block copolymer having been selectively hydrogenated so that the polymerized butadiene units are substantially completely hydrogenated while a number of polymerized I units retain their unsaturation sufficient to vulcanize said block copolymer.

2. The blend of claim 1 wherein said selectively hydrogenated block has been subjected to a vulcanization treatment.

3. The blend of claim 1 wherein said block copolymer is composed of the blocks of category 1) and comprises about 1 to 50 wt. % of I polymer blocks, about 50 to 98 wt. % of butadiene polymer blocks, and about 1 to 30 wt. % of S polymer blocks, all based on the total weight of said block copolymer.

4. The blend of claim 1 wherein said block copolymer is composed of the blocks of category 2) and comprises an average of about 70 to 99 wt. % of IB random copolymer blocks, and about 1 to 30 wt. % of S polymer blocks, all based on the total weight of block copolymer, with the polymerized I units being an average of about 1 to 50 wt. % of each random IB copolymer block, with the remainder being polymerized butadiene.

5. The blend of claim 1 wherein said block copolymer is composed of five blocks of category 1) in which the end blocks are polymers of diene I, the second and fourth blocks are polymers of butadiene, and the central block is a polymer of aryl-substituted olefin S.

6. The blend of claim 1 wherein said pentablock copolymer has the formula

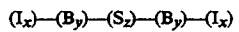

wherein x is the average number of polymerized I units in each I polymer block and has an average value of about 7 to 368 (one half the molecular total), y is the number of polymerized butadiene (B) units in each B polymer block and has an average value of about 185 to 907 (one half the molecular total), and z is the number of polymerized S units in the S polymer block and has an average value of about 10 to 288, all values being per 100,000 M.W.

7. The blend of claim 6 wherein I is isoprene and S is styrene, and at least 25% of the polymerized butadiene units have the 1,2 microstructure.

8. The blend of claim 7 wherein said selectively hydrogenated block copolymer has been subjected to a vulcanization treatment.

9. The blend of claim 1 wherein said block copolymer is composed of five blocks of category 1) in which the end blocks are polymers of diene I, the second and fourth blocks are polymers of aryl-substituted olefin S, and the central block is a polymer of butadiene.

10. The blend of claim 9 wherein said pentablock copolymer has the formula

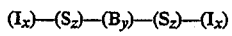

wherein x is the number of polymerized I units in each I polymer block and has an average value of about 7 to 368 (one half the molecular total), y is the number of polymerized butadiene units in the B polymer block and has an average value of about 370 to 1815, and z is the number of polymerized S units in the S polymer block and has an average value of about 5 to 144 (one half the molecular total), all values being per 100,000 M.W.

11. The blend of claim 10 wherein I is isoprene and S is styrene, and at least 25% of the polymerized butadiene units have the 1,2 microstructure.

12. The blend of claim 10 wherein I is isoprene and S is styrene, and at least 25% of the polymerized butadiene units have the 1,2 microstructure.

13. The blend of claim 11 wherein said selectively hydrogenated block copolymer has been subjected to a vulcanization treatment.

14. The blend of claim 1 wherein said block copolymer is composed of three blocks of category 2) wherein the end blocks are each a random copolymer of diene I and butadiene and the central block is a polymer of aryl-substituted olefin S.

15. The blend of claim 14 wherein said triblock copolymer has the formula

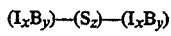

wherein x is the number of polymerized I units in each random IB copolymer block and has an average value of about 7 to 368, y is the number of polymerized butadiene (B) units in each random IB copolymer block and has an average value in the range of about 185 to 907, and z is the number of polymerized S units in the central block and has a value of about 10 to 288, said values being per 100,000 M.W.

16. The blend of claim 15 wherein said selectively hydrogenated block copolymer has been subjected to a vulcanization treatment.

17. The blend of claim 1 wherein said block copolymer is in the form of a star-branched polymer with each branch being a triblock copolymer containing an outermost I polymer block, a central butadiene polymer block and an innermost S polymer block and wherein the average total molecular number of polymerized I units in all the branches is in the range of about 15 to 735, the average total molecular number of polymerized butadiene units in all the branches is in the range of about 370 to 1815, and the average total molecular number of polymerized S units in all the branches is in the range of about 10 to 288, all values being per 100,000 M.W.

18. The blend of claim 17 wherein I is isoprene and S is styrene, and at least 25% of the polymerized butadiene units have the 1,2 microstructure.

19. The blend of claim 18 wherein said selectively hydrogenated star-branched block copolymer has been subjected to a vulcanization treatment.

20. The blend of claim 1 wherein said block copolymer is in the form of a star-branched polymer with each branch being a triblock copolymer containing an outermost I polymer block, a central S polymer block and an innermost butadiene polymer block and wherein the average total molecular number of polymerized I units in all the branches is in the range of about 15 to 735, the average total molecular number of polymerized butadiene units in all the branches is in the range of about 370 to 1815, and the average total molecular number of polymerized S units in all the branches is in the range of about 10 to 288, all values being per 100,000 M.W.

21. The blend of claim 20 wherein I is isoprene and S is styrene, and at least 25% of the polymerized butadiene units have the 1,2 microstructure.

22. The blend of claim 21 wherein said selectively hydrogenated star-branched block copolymer has been subjected to a vulcanization treatment.

23. The blend of claim 1 wherein said block copolymer is in the form of a star-branched polymer with each branch being a diblock copolymer containing an external random IB copolymer block and an internal S polymer block and wherein the average total molecular number of polymerized I units in all the branches is in the range of about 15 to 735, the average total molecular number of polymerized butadiene units in all the branches is in the range of about 370 to 1815, and the average molecular number of polymerized S units in all the branches is in the range of about 10 to 288, all values being per 100,000 M.W.

24. The blend of claim 23 wherein I is isoprene and S is styrene, and at least 25% of the polymerized butadiene units have the 1,2 microstructure.

25. The blend of claim 24 wherein said selectively hydrogenated star-branched block copolymer has been subjected to a vulcanization treatment.

26. The blend of claim 1 containing said material and a sulfonated polymer produced by a method comprising sulfonating said selectively hydrogenated block copolymer, followed by neutralization of the thus formed polymeric sulfonic acid with metal ions or amines.

27. The blend of claim 1 containing said material and a maleated polymer produced by a method comprising contacting said selectively hydrogenated block copolymer with maleic anhydride.

28. The blend of claim 1 containing said material and an epoxidized polymer produced by a method comprising contacting said selectively hydrogenated block copolymer with a reagent capable of reacting with unsaturated groups to produce epoxy groups.

29. The blend of claim 1 wherein said material is nylon.

30. The blend of claim 1 wherein said material is a polyester.

* * * * *